US009902054B2

(12) United States Patent
Croll

(10) Patent No.: US 9,902,054 B2
(45) Date of Patent: Feb. 27, 2018

(54) EMBEDDED REGULATOR FOR PNEUMATIC NAILER SUPPLEMENTAL AIR TANK

(71) Applicant: ILLINOIS TOOL WORKS INC., Glenview, IL (US)

(72) Inventor: John W. Croll, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 791 days.

(21) Appl. No.: 14/253,297

(22) Filed: Apr. 15, 2014

(65) Prior Publication Data

US 2015/0290787 A1 Oct. 15, 2015

(51) Int. Cl.

*B25C 1/04* (2006.01)
*F16K 1/30* (2006.01)
*G05D 16/04* (2006.01)

(52) U.S. Cl.

CPC ................ *B25C 1/04* (2013.01); *B25C 1/047* (2013.01); *G05D 16/04* (2013.01)

(58) Field of Classification Search

CPC . F16K 15/14; F16K 15/00; F16K 1/30; B65D 47/04; Y10T 137/86332; G05D 16/00; G05D 16/04

USPC ...................................... 137/587, 588, 513.7

See application file for complete search history.

(56) References Cited

U.S. PATENT DOCUMENTS 3,638,532 A 2/1972 Novak
3,954,176 A 5/1976 Haytayan
4,188,858 A 2/1980 Plunkett
4,204,622 A 5/1980 Smith et al.
4,211,352 A 7/1980 Zilka
4,530,455 A 7/1985 Vornberger
4,564,483 A * 1/1986 Jeans ........................ A23L 2/54 137/512.3
5,020,712 A 6/1991 Monacelli
5,438,829 A 8/1995 Kubota et al.
5,465,875 A * 11/1995 Garnett ............... A01M 7/0092 134/166 R
6,196,331 B1 3/2001 Naito et al.
6,675,831 B2 * 1/2004 Sakaguchi ................ F17C 1/06 137/505.25
7,156,012 B2 1/2007 Komazaki et al.
7,398,647 B2 7/2008 Komazaki et al.
7,494,035 B2 2/2009 Weaver et al.

(Continued)

FOREIGN PATENT DOCUMENTS

DE 1603847 4/1972
DE 29513400 10/1995

OTHER PUBLICATIONS

International Search Report of International Searching Authority for International Application No. PCT/US2015/019128, dated Mar. 6, 2015.

*Primary Examiner* — Andrew M Tecco
(74) *Attorney, Agent, or Firm* — Neal, Gerber & Eisenberg LLP

(57) ABSTRACT

A pneumatic power system utilizing compressed air provided by a compressor is provided, including a supplemental air tank having an inlet port and defining an internal cavity, an embedding piece engaged in the inlet port, a regulator is connected to the embedding piece for fluid connection to the compressor, and the regulator being substantially enclosed within the cavity.

12 Claims, 2 Drawing Sheets

(56) References Cited

U.S. PATENT DOCUMENTS

| | | | | |
|---|---|---|---|---|
| 7,887,303 | B2 * | 2/2011 | Sadkowski | F04B 35/06 417/234 |
| 8,282,363 | B2 * | 10/2012 | Ohi | F04B 35/06 417/234 |
| 8,307,842 | B2 * | 11/2012 | Nakata | F16K 1/30 137/15.17 |
| 9,328,830 | B2 * | 5/2016 | Petroci | F16K 15/00 |
| 9,371,913 | B2 * | 6/2016 | Lhymn | F16K 31/42 |
| 2002/0040729 | A1 * | 4/2002 | Takeda | F16K 1/305 137/74 |
| 2003/0183670 | A1 | 10/2003 | Barber et al. | |
| 2004/0154668 | A1 * | 8/2004 | Larsen | F16K 1/305 137/505.25 |
| 2005/0156008 | A1 | 7/2005 | Komazaki et al. | |
| 2005/0247750 | A1 * | 11/2005 | Burkholder | B25C 1/047 227/130 |
| 2008/0078799 | A1 | 4/2008 | Wen | |
| 2008/0273994 | A1 * | 11/2008 | Sadkowski | F04B 35/06 417/234 |
| 2010/0193560 | A1 | 8/2010 | Liang et al. | |
| 2010/0290929 | A1 * | 11/2010 | Ohi | F04B 41/02 417/360 |
| 2012/0223120 | A1 * | 9/2012 | Mina | B25C 1/042 227/130 |
| 2014/0090732 | A1 * | 4/2014 | Schieler | B25C 1/041 137/565.18 |
| 2014/0174574 | A1 * | 6/2014 | Lhymn | F16K 31/42 137/583 |

* cited by examiner

EMBEDDED REGULATOR FOR PNEUMATIC NAILER SUPPLEMENTAL AIR TANK

BACKGROUND

The present invention relates to pneumatically operated power tools, and more specifically to systems for jobsite operation of pneumatically powered fastener drivers, also referred to as pneumatic nailers.

Conventional pneumatic nailers, such as those disclosed in U.S. Pat. No. 3,638,532 and U.S. Patent Application Publication No. 2012/0223120-A1, both of which incorporated by reference herein, are connected to a source of compressed air, typically a compressor, via an extended length hose. Per industry standards, the compressors are set at a maximum output of 120-125 psi. In a conventional construction jobsite, where pneumatic nailers of this type are commonly used, the compressor hose can reach 200 feet (60.96 meters) in length. A major reason for the long hoses is that the users prefer to locate the compressor outside the residence or building where the construction work is being performed to reduce noise. A common drawback of such systems is that the nailer experiences a pressure drop over the length of the hose, such that a 110-130 psi regulated output at the compressor can drop to approximately 100-90 psi at the nailer. In conventional framing nailers driving nails into pine boards, the required pressure for fully driving the fastener is approximately 100-110 psi. Thus, it is not uncommon for tools to incompletely drive the nails into the workpiece or substrate. The user then follows the nailer with a manual hammer for completing the fastener driving process. Thus, there is a desire on the part of users to avoid follow-up work with conventional hammers.

One attempted solution to the pressure drop at the nailer is to provide the nailer with a housing that stores a residual supply of compressed air to buffer or supplement the air provided by the compressor. In such tools, sufficient storage space is provided to retain approximately 25% more compressed air volume than is required to drive a single nail. While the additional storage space in the tool addresses the pressure required to completely drive a single nail, it is customary for the pressure delivered by a conventional nailer to decrease with subsequent fasteners driven in relatively close succession. For example, an initial fastener is driven at approximately 110 psi with the housing-stored pressure boost, the second at 100 psi, the third at 95 psi and the fourth at 90 psi. In such a scenario, the user often resorts to use of his hammer to complete the driving of the second through fourth fasteners, with more manual energy required as the nailer output decreases. In other cases, the users have been known to increase the output pressure of the compressor above the nailer's maximum pressure rating (approximately 140-150 psi), which can cause premature nailer wear, tool damage and/or failure.

A drawback of the enlarged tool housing, the conventional response to tool pressure drops described above, is that the tool is relatively heavy, at approximately 7.5-8.5 pounds (3.4-3.8 kg) for a framing-type tool. Pneumatic nailers are usually provided in two sizes, a relatively larger framing tool, and a relatively smaller trim tool. Another drawback of the conventional pneumatic nailer system described above is that the user encounters a physical drag on his efforts caused by the length and weight of the air supply hose, which at approximately 200 feet, is cumbersome to manipulate on the jobsite.

A solution to the above-listed problem is addressed in co-pending, commonly assigned U.S. patent application Ser. No. 13/632,114, filed Sep. 30, 2012, which is incorporated by reference. Basically, a pneumatic nailer system features a pneumatic nailer having a significantly reduced housing size, in that the overall tool is approximately 25-30% lighter than a standard pneumatic framing tool. A main source of the reduction in size is the elimination of extra compressed air storage volume within the tool housing. In the disclosed tool housing, there is only enough stored compressed air to power the driving of a single fastener. This differs from conventional framing tools, where the housing defines a buffer storage area to supplement the compressed air provided by the compressor, and for alleviating the typical pressure drop encountered when long hoses are used, and/or multiple tools are connected to a single compressor. Instead of in-tool compressed air storage, the disclosed system provides a supplemental air tank located between the compressor and the tool for providing a more consistent supply of compressed air located closer to the nailer that is less susceptible to pressure drops.

Another benefit of the disclosed pneumatic tool is that internal storage, swept and return volumes are dimensioned in a way that has been found to significantly increase the power of the disclosed tool relative to the size of the tool. With the disclosed tool and the supplemental air tank, the tool generates approximately 80 Joules of energy for each fastener driving cycle, even after multiple fasteners are driven, with a tool weighing approximately 6 pounds. In other words, the disclosed tool drives successive fasteners at approximately 100 psi on a more consistent basis than conventional pneumatic framing nailers connected by a hose directly to a compressor.

However, an aspect of operation of the above-identified system is that the conventional pressure regulator is mounted to the supplemental air tank in a conventional orientation, using threaded pipe stem nipples. As such, the regulator is prone to impact damage inherent with the jobsite environment. In addition, operators have been able to access the regulator, making adjustments which in some cases interfere with desired system performance. Thus, there is a need for providing a pneumatic power system where the pressure regulator on the supplemental air tank is protected from damage as well as from unwanted adjustment or manipulation.

SUMMARY

The above-identified drawbacks of conventional pneumatically operated tool power systems are addressed by providing a pneumatic nailer system featuring a supplemental air tank having a pressure regulator in fluid communication with the remote compressor as well as with the air tank. As is known in the art, the regulator receives output pressure from the compressor, potentially in the range of 150 psi, and reduces the pressure delivered to the tank to a desired value, such as 125 psi. An important feature of the present system is that the present pressure regulator is substantially embedded within the supplemental air tank, such that the only and principal protruding component is a conventional connection nipple configured for matingly engaging an air hose coupling. The remainder of the regulator is positioned within the main storage cavity of the air tank. In addition, an embedding piece supports the mounting of the regulator body as desired, and also provides a vent to atmosphere for the embedded regulator body.

Another feature of the present system is that the embedding piece secures the regulator body in place, preventing movement relative to the tank along a longitudinal axis of the regulator body. In a preferred construction, the regulator body is secured to the embedding piece by roll pins extending generally perpendicularly to the longitudinal axis of the regulator. Then, the embedding piece is threaded into an inlet opening of the air tank. A check valve associated with the regulator is also located within the air tank for allowing incoming pressurized air to enter the tank, and restricting the external flow of such air. In the preferred construction, the check valve is located at an opposite end of the regulator body from the connection nipple. As is known in the art, the regulator is set to permit an in-tank pressure in the range of 125 psi.

More specifically, a pneumatic power system utilizing compressed air provided by a compressor is provided, including a supplemental air tank having an inlet port and defining an internal cavity, an embedding piece engaged in the inlet port, a regulator is connected to the embedding piece for fluid connection to the compressor, and the regulator being substantially enclosed within the cavity.

In another embodiment, a pneumatic nailer system is provided, including a compressor, a supplemental air tank, a supply hose connecting the compressor and the supplemental air tank. A regulator is in fluid communication with the compressor and mounted to the supplemental air tank to be substantially embedded in an internal storage cavity of the air tank.

DETAILED DESCRIPTION

Figure 1:
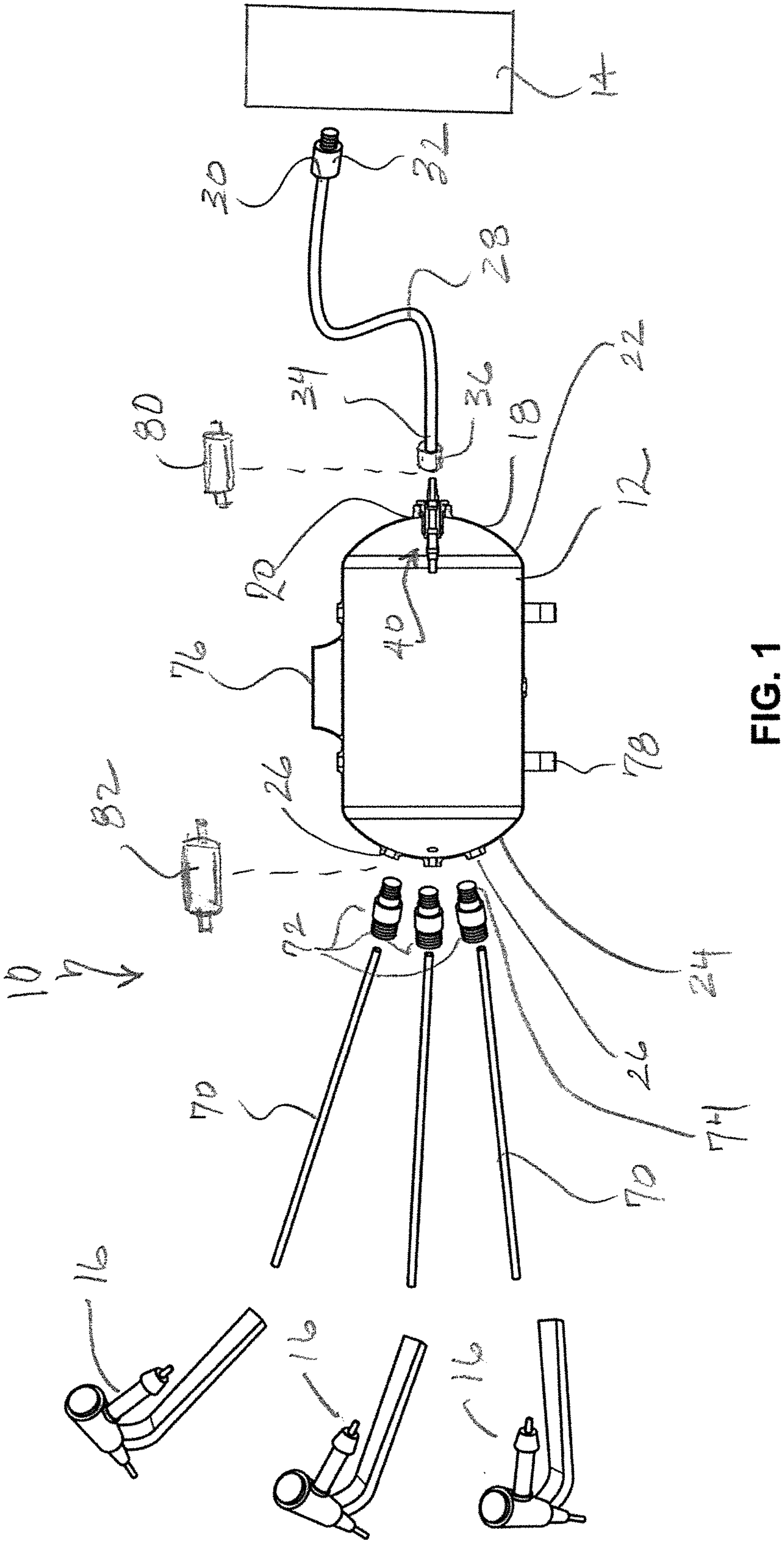
FIG. 1 is a side elevation of a pneumatic tool power system including a supplemental air tank in vertical cross-section suitable for use with the present embedded regulator.

Referring to FIG. 1, a pneumatic nailer system is generally designated 10, includes a supplemental air storage tank 12 connected between a main storage tank of an air compressor schematically represented at 14 and one or more pneumatic fastening tools, such as pneumatic nailers 16, also referred to as tools. As described in further detail in copending U.S. patent application Ser. No. 13/632,114, incorporated by reference, a main advantage of the supplemental air tank 12 is that it supplies additional pressurized air to the pneumatic fastening tools to compensate or adjust for air pressure losses that occurs in the long air hoses connecting conventional air compressors to pneumatic fastening tools. In the present system, the result is more consistent fastener driving power being supplied to a relatively lighter nailer 16. In the illustrated embodiment, the supplemental air tank 12 includes a first end 18 having a threaded inlet port 20 that is secured, as by welding to an outer surface 22 of the tank. An opposing second end 24 of the supplemental air tank 12 includes one or a plurality of threaded outlet ports 26 that are also secured, as by welding to the outer surface 22 of the tank. In the preferred embodiment, the outlet port or outlet ports 26 each have a ⅜ inch (0.953 cm) inside diameter. It should be appreciated that the inlet port 20 has a relatively larger diameter than the outlet ports 26, as described in greater detail below. The particular size and location of the ports 20, 26 may vary to suit the application.

Pressurized air from the main air tank of the air compressor 14 is communicated or directed to the supplemental air tank 12 via a compressor supply hose or first air hose 28. The compressor hose 28 preferably has at least a ⅜ inch (0.953 cm) diameter but may be any suitable size or diameter. Furthermore, the compressor hose 28 has a length of up to about 200 feet and is preferably 50 feet. A first end 30 of the compressor hose 28 includes a hose coupler fitting 32 of known construction. The fitting 32 is releasably connected to a complementary fitting on the compressor 14, using threaded or "quick-connect" fittings also known in the art. A second, opposing end 34 of the first compressor hose 28 includes a similar coupler fitting 36.

Figure 2:
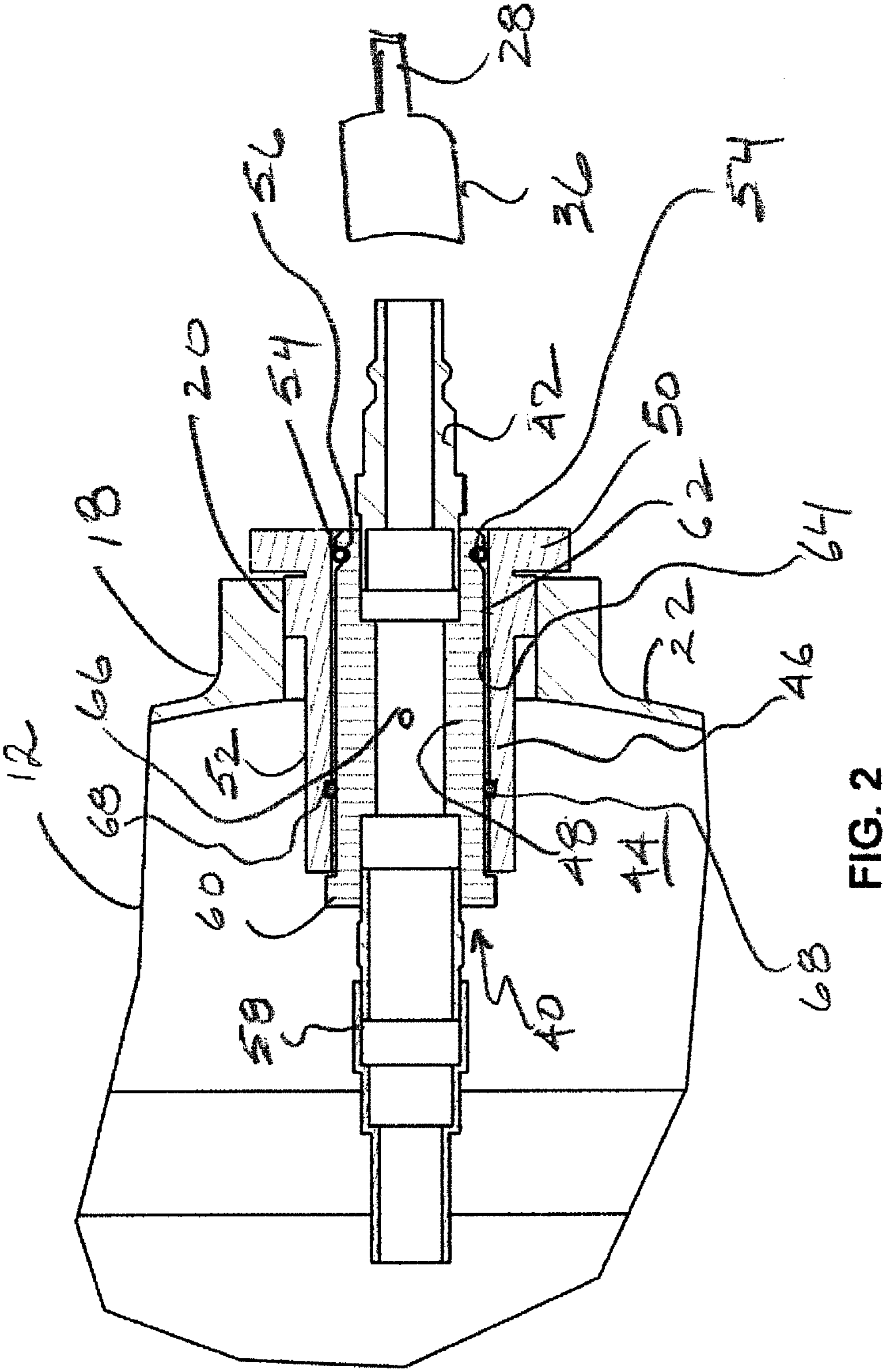
FIG. 2 is an enlarged vertical cross-section of the present regulator and associated components used to embed the regulator within the storage tank of FIG. 1.

Referring now to FIGS. 1 and 2, a pressure regulator, generally designated 40, is connected to the fitting 36 and is in fluid communication with the remote compressor 14 as well as with the supplemental air storage tank 12. As is known in the art, the regulator 40 receives output pressure from the compressor 14, potentially in the range of 150 psi, and reduces the pressure delivered to the tank to a desired value, such as 125 psi. It is contemplated that the desired pressure setting may vary to suit the situation.

An important feature of the present supplemental air storage tank 12 is that the present pressure regulator 40 is substantially embedded within the supplemental air tank, such that the only and principal protruding component is a conventional connection nipple fitting 42 configured for matingly engaging the air hose coupler fitting 36 as is known in the art. The remainder and a largest part of the regulator 40 is positioned within a main storage cavity 44 of the air tank 12. In addition, an embedding piece 46 supports the mounting of a regulator body 48 as desired, and also provides a vent to atmosphere for the embedded regulator body. The embedding piece 46 is threadably engaged in the compressor inlet port 20, which is complementarily dimensioned, and is contemplated as having a larger diameter than the conventional ⅜ inch tank ports 26. A radially enlarged, preferably faceted flange 50 on the embedding piece 46 facilitates installation of the embedding piece on the storage tank 12, such as by a wrench. A sealant, such as Teflon® tape or other suitable sealant may be added to the threads on the inlet port 20 to enhance the seal between the inlet port and the embedding piece 46. As seen in FIG. 2, a main housing 52 of the embedding piece 46 extends axially into the main storage cavity 44 so that the regulator 40 is substantially enclosed within the cavity.

Another feature of the present storage tank 12 and the regulator 40 is that the embedding piece 46 secures the regulator body 48 in place, preventing regulator movement relative to the tank along a longitudinal axis of the regulator body. In a preferred construction, the regulator body 48 is secured to the embedding piece 46 by roll pins 54 extending generally perpendicularly to the longitudinal axis of the regulator. As is known in the art, the roll pins 54 engage complementary throughbores or grooves 56 in the regulator and openings (not shown) in the embedding piece 46. A check valve 58 associated with the present in-tank regulator 40 is also located within the air tank 12 for allowing incoming pressurized air to enter the tank, and restricting the external flow of such air. In the preferred construction, the check valve 58 is located at, and threadably engaged in, an opposite end 60 of the regulator body from the connection nipple 42. As is known in the art, the regulator is set to permit an in-tank pressure in the range of 125 psi.

For enabling venting of the regulator 40, an annular clearance or vent 62 is provided and is defined between the regulator body 48 and an inner bore 64 of the embedding piece 46. The vent 62 is open to atmosphere, and is in fluid communication with an outlet port 66 of the regulator 40. As is known in the regulator art, the vent 62 provides an operational reference point for a spring-biased piston (not shown). At least one sealing O-ring 68 disposed between the regulator body 48 and the embedding piece inner bore 64 sealingly separates the vent 62 with the tank interior cavity 44.

Referring again to FIG. 1, each pneumatic nailer 14 is connected to one of the outlet ports 26 of the supplemental air tank 12 using a second air hose or tool air hose 70. The tool hoses 70 are preferably each between ¼ inch and ⅜ inch (0.635 cm and 0.953 cm) in diameter and have a length extending approximately to two hundred feet (61 m). In the illustrated embodiment, each tool hose 70 has a length of about 50 to 100 feet (15.24 to 30.48 m) for supplying pressurized air from the supplemental air tank 12 to each pneumatic nailer 16. In the present system 10, each end of each tool air hose 70 includes a ⅜ inch (0.953 cm) hose coupler 72 as described above having a threaded nipple 74 on one end for engaging the outlet ports. It is contemplated that the coupler 72 is provided in any conventionally available configuration.

In the above embodiment, the supplemental air tank 12 has a nine gallon air capacity and is made of steel. It should be appreciated that the supplemental air tank may be any suitable size and be made of any suitable material or combination of materials. As shown in FIG. 1, the supplemental air tank 12 includes a handle 76 located on top of the tank for transporting the tank from job site to job site. A pair of depending supports or feet 78 is attached to a bottom of the supplemental air tank 12 to enable the tank to securely stand on an underlying surface such as on the ground or scaffolding.

As stated above, conventional air compressors are connected directly to a pneumatic nailer by a long hose that is approximately 200 feet. The long hose is desired by users so that noisy air compressors can be placed a sufficient distance away from a job site such as a house or building. The drop in air pressure over the long air hose, however, results in inconsistent fastening results. In addition, the long hose is cumbersome to manipulate by users. The present system 10 overcomes this problem by providing the supplemental air tank 12 between the compressor 14 and each pneumatic nailer 16, in which the pressurized air travels a shorter distance through the compressor hose 28 and each tool hose 70, i.e., 50 to 100 feet (15.24 to 30.48 m), and thereby provides a sufficient amount of pressurized air to each pneumatic nailer to fully drive one or more fasteners into a workpiece. In the preferred embodiment, the supplemental air tank 12 is located midway between the compressor 14 and the pneumatic nailer(s) 16. Specifically, the pressurized air is approximately 100-110 psi at the outlet port of the main compressor and approximately 100 psi at the inlet port to each pneumatic nailer 16, thereby reducing the pressure drops experienced in conventional pneumatic nailer systems and providing more consistent fastening results.

In operation, the regulator 40 is secured to the embedding device 46 using the roll pins 54 laterally inserted through openings in the embedding device that engage the grooves 56 in the regulator. Next, the embedding device 46 is secured to the tank 12 using the faceted flange 50, which facilitates the tight engagement between the embedding device and the inlet port 20. The present system 10 optionally includes an air filter 80 placed in the line from the compressor 14 and in fluid communication with the regulator 40 for removing impurities in the compressed air prior to the air being sent to the tools 16. Another option is an oiler 82, placed in the system 10 and connected to the tank 12 for facilitating lubricating of the nailers 16 during operation.

While a particular embodiment of the present embedded regulator for pneumatic nailer supplemental air tank, it will be appreciated by those skilled in the art that changes and modifications may be made thereto without departing from the invention in its broader aspects and as set forth in the following claims.

What is claimed:

1. A pneumatic power system comprising:
- a supplemental air tank having an inlet port and defining an internal cavity;
- an embedding piece engaged in the inlet port; and
- a pressure regulator connected to the embedding piece such that the pressure regulator is upstream of, substantially enclosed within, and in fluid communication with the internal cavity, wherein the pressure regulator is fluidly connectable to a compressor and configured to reduce the pressure of fluid delivered from the compressor to a designated pressure before the fluid enters the supplemental air tank.

2. The power system of claim 1 further including a vent defined between the pressure regulator and a bore of the embedding piece, the vent fluidly connecting an outlet port of the pressure regulator with atmosphere.

3. The power system of claim 2 further including a seal separating the vent from the internal cavity.

4. The power system of claim 1 further including a check valve connected to an outlet of the pressure regulator.

5. The power system of claim 4 wherein the check valve is located on the pressure regulator on an opposite end from a connection nipple fitting.

6. The power system of claim 1 further including an air filter in fluid communication with the pressure regulator.

7. The power system of claim 1 further including a tool oiler connected to the supplemental air tank.

8. A pneumatic nailer system comprising:
- a compressor;
- a supplemental air tank;
- a pressure regulator upstream of, substantially embedded in, and in fluid communication with an internal storage cavity of the supplemental air tank and configured to reduce the pressure of fluid delivered from the compressor to a designated pressure before the fluid enters the supplemental tank; and
- a supply hose mechanically connectable to the compressor and the regulator to fluidly connect the compressor and the supplemental air tank.

9. The system of claim 1 further including at least one nailer mechanically connectable to the supplemental air tank via an associated hose to fluidly connect the at least one nailer and the supplemental air tank.

10. The system of claim 8 further including an embedding device having a central bore dimensioned to accommodate the regulator, the embedding device being disposed in an inlet opening of the supplemental air tank.

11. The system of claim 10 further including a vent defined between the pressure regulator and a bore of the embedding device, the vent fluidly connecting an outlet port of the pressure regulator with atmosphere.

12. The system of claim 11 further including a seal separating the vent from the internal storage cavity.

* * * * *